(12) United States Patent
Hotta et al.

(10) Patent No.: US 10,236,520 B2
(45) Date of Patent: Mar. 19, 2019

(54) GAS-LIQUID SEPARATOR AND FUEL CELL SYSTEM

(71) Applicant: TOYOTA JIDOSHA KABUSHIKI KAISHA, Toyota-shi, Aichi-ken (JP)

(72) Inventors: Yutaka Hotta, Toyota (JP); Michitaro Itoga, Okazaki (JP); Tateki Takayama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 546 days.

(21) Appl. No.: 14/939,631

(22) Filed: Nov. 12, 2015

(65) Prior Publication Data

US 2016/0141658 A1 May 19, 2016

(30) Foreign Application Priority Data

Nov. 14, 2014 (JP) .................. 2014-231293

(51) Int. Cl.
*H01M 8/04119* (2016.01)
*B01D 19/00* (2006.01)
*H01M 8/248* (2016.01)

(52) U.S. Cl.
CPC .... *H01M 8/04156* (2013.01); *B01D 19/0042* (2013.01); *H01M 8/04164* (2013.01); *H01M 8/248* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | |
|---|---|---|
| 2004/0247984 A1 | 12/2004 | Ismaier et al. |
| 2009/0087699 A1 | 4/2009 | Takemoto et al. |
| 2013/0017470 A1 | 1/2013 | Hotta et al. |
| 2013/0202979 A1 | 8/2013 | Katano et al. |
| 2016/0126567 A1 | 5/2016 | Yamaura |

FOREIGN PATENT DOCUMENTS

| | | |
|---|---|---|
| CA | 2 909 869 A1 | 5/2016 |
| EP | 2280440 A1 | 2/2011 |
| JP | 2007-87718 | 5/2007 |
| JP | 200987858 | 4/2009 |
| JP | 2011-070804 A | 4/2011 |
| JP | 2013-93256 | 5/2013 |
| JP | 5354026 | 9/2013 |
| JP | 2016-091732 A | 5/2016 |
| KR | 10-2004-0037169 A | 5/2004 |

*Primary Examiner* — Sarah A. Slifka
(74) *Attorney, Agent, or Firm* — Finnegan, Henderson, Farabow, Garrett & Dunner, LLP

(57) ABSTRACT

A gas-liquid separator includes a gas-liquid separator forming portion that is provided in an end plate, and a cover member. The gas-liquid separator forming portion includes a first inner wall portion that serves as a flow path for an off-gas and forms a part of an accumulating portion, the first inner wall portion having a shape recessed in a thickness direction of the end plate. The cover member includes a second inner wall portion that has a shape recessed in a thickness direction of the cover member, the second inner wall portion being disposed to face the first inner wall portion in a stack direction and forming the accumulating portion together with the first inner wall portion.

7 Claims, 15 Drawing Sheets

F I G . 10B
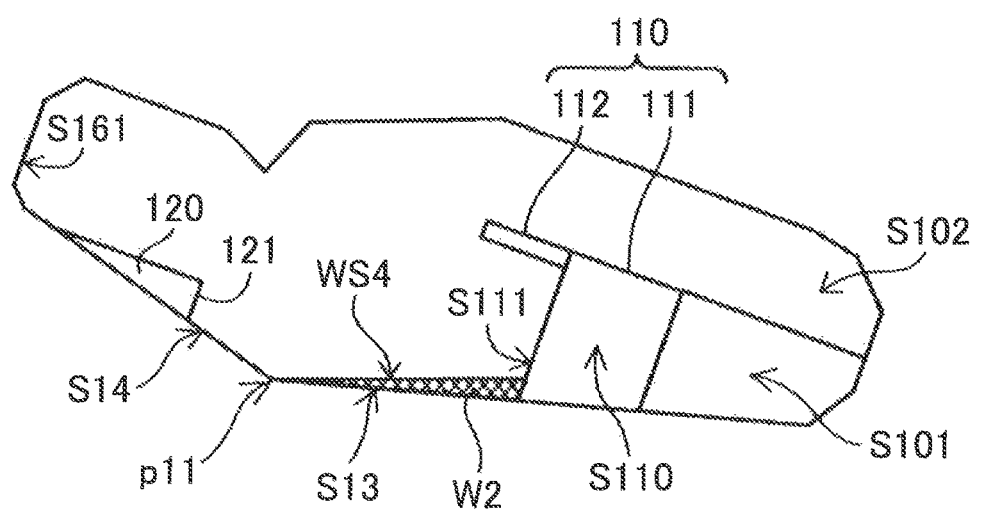

MODIFIED EXAMPLE

GAS-LIQUID SEPARATOR AND FUEL CELL SYSTEM

INCORPORATION BY REFERENCE

The disclosure of Japanese Patent Application No. 2014-231293 filed on Nov. 14, 2014 including the specification, drawings and abstract is incorporated herein by reference in its entirety.

BACKGROUND OF THE INVENTION

1. Field of the Invention

The invention relates to a gas-liquid separator that separates and discharges water contained in an off-gas discharged from a fuel cell.

2. Description of Related Art

Since an electrolyte membrane used in a fuel cell such as a polymer electrolyte fuel cell is capable of exhibiting high electric power generation performance in a high humid state, a reaction gas supplied to the fuel cell may be humidified. In addition, for the purpose of improving the utilization rate of a reaction gas and preventing water from remaining in a fuel cell, a circulation-type reaction gas supply mechanism that separates water from an off-gas discharged from the fuel cell and supplies a resultant reaction gas to the fuel cell again may be used. In such a reaction gas supply mechanism, a gas-liquid separator is used to separate water from an off-gas. For example, in a fuel cell system disclosed in Japanese Patent No. 5354026, a supply path for supplying a reaction gas to a fuel cell stack and a discharge path for discharging an off-gas from the fuel cell stack are formed in an end plate (stack manifold), and a gas-liquid separator is connected to the end plate.

However, in the fuel cell system disclosed in Japanese Patent No. 5354026, since the gas-liquid separator is disposed separately from the end plate, the total installation space for the end plate and the gas-liquid separator is very large, which results in an increase in the size of the fuel cell system. For this reason, technology capable of suppressing an increase in the sizes of a fuel cell system including a gas-liquid separator has been demanded.

SUMMARY OF THE INVENTION (1) An aspect of the invention provides a gas-liquid separator configured to separate and drain water contained in an off-gas discharged from a fuel cell including a cell stack in which a plurality of unit cells is stacked, and an end plate disposed outside the cell stack in a stack direction in which the plurality of unit cells is stacked. The gas-liquid separator includes a gas-liquid separator forming portion that is provided in the end plate, is opened in an end surface of the end plate in the stack direction, and constitutes a part of the gas-liquid separator, the end surface being located on a side opposite to the cell stack; and a cover member that is disposed to cover an opening of the gas-liquid separator forming portion and constitutes a part of the gas-liquid separator. The gas-liquid separator forming portion includes a first inner wall portion that serves as a flow path for the off-gas and forms a part of an accumulating portion in which the water separated from the off-gas is accumulated, the first inner wall portion being connected to the opening and having a shape recessed in a thickness direction of the end plate; and the cover member includes a second inner wall portion that is connected to an opening provided in a surface of the cover member facing the gas-liquid separator forming portion, and that has a shape recessed in a thickness direction of the cover member, the second inner wall portion being disposed to face the first inner wall portion in the stack direction and forming the accumulating portion together with the first inner wall portion. The gas-liquid separator according to the aspect includes the gas-liquid separator forming portion provided in the end plate and the cover member. Therefore, an increase in the size of the total installation space for the end plate and the gas-liquid separator can be suppressed as compared to a configuration in which the gas-liquid separator is provided separately from the end plate. Therefore, an increase in the size of a fuel cell system can be suppressed when the gas-liquid separator according to the aspect is used in a fuel cell system.

(2) In the gas-liquid separator according to the above-mentioned aspect, the gas-liquid separator forming portion may include an inflow port forming portion that forms an inflow port through which the off-gas flows into the gas-liquid separator and a discharge port forming portion that forms a discharge port through which the off-gas is discharged from the gas-liquid separator; and the cover member may include a drain flow path forming portion that forms a drain flow path through which the water accumulated in the accumulating portion is drained. In the gas-liquid separator with this configuration, the gas-liquid separator forming portion includes both the inflow port forming portion and the discharge port forming portion, and the second inner wall portion of the cover member has the shape recessed in the thickness direction of the cover member. Therefore, the flow of the off-gas inside the accumulating portion becomes a substantially U-shaped flow. As a result, a total length of the flow path can be increased to increase opportunities to separate water from the off-gas.

(3) In the gas-liquid separator according to the above-mentioned aspect, the drain flow path may have, at an end thereof, a drain port that is disposed in vicinity of a bottom surface of the second inner wall portion and exposed to an inside of the accumulating portion; the cover member may further include a projection portion that projects upward from the bottom surface in a state in which the gas-liquid separator is placed, and that is disposed between a position facing the inflow port and the drain port in the cover member, and an inclined surface that faces the inflow port and is disposed in contact with the projection portion, the inclined surface being gradually inclined downward along a first direction from the cover member to the gas-liquid separator forming portion in the state in which the gas-liquid separator is placed; and an end surface of the projection portion in the first direction may be offset in a direction opposite to the first direction from an end surface of the entire cover member in the first direction. In the gas-liquid separator with this configuration, the projection portion is disposed between the position facing the inflow port and the drain port in the cover member. Therefore, the off-gas flowing from the inflow port to the cover member can be prevented from linearly heading for the drain port. Thus, it is possible to prevent occurrence of a situation in which the off-gas collides with water accumulated in the vicinity of the drain port and thus the water is scattered and flows into the discharge port. As a result, the efficiency of separating water from the off-gas can be improved. In addition, the projection portion can prevent water accumulated in the accumulating portion from swirling up due to the off-gas that flows inside the accumulating portion, and heading for (returning to) the off-gas inflow port. Moreover, the end surface of the projection portion in the first direction is offset (deviates) in the direction opposite to the first direction from the end surface of the entire cover member in the first direction. Therefore, a gap can be provided between the end surface of the projection portion in the first direction and the gas-liquid separator forming portion. Thus, water falling along the inclined surface disposed in contact with the projection portion can be guided into the drain port via the gap. Accordingly, water can be prevented from remaining inside the accumulating portion.

(4) In the gas-liquid separator according to the above-mentioned aspect, a part of the bottom surface, which contacts the end surface of the projection portion in the first direction, may be inclined downward toward the drain port in the state in which the gas-liquid separator is placed. In the gas-liquid separator with this configuration, a part of the bottom surface of the cover member contacting the end surface of the projection portion in the first direction is inclined downward toward the drain port. Therefore, in this part, the flow of water heading for the drain port can be promoted.

(5) In the gas-liquid separator according to the above-mentioned aspect, a lowest point of the bottom surface may be disposed between the projection portion and the drain port; and a length along the bottom surface and between the projection portion and the lowest point may be shorter than a length between the lowest point and a portion of the second inner wall portion that is positioned on an opposite side of the lowest point from the projection portion. In the gas-liquid separator with this configuration, the water surface of water accumulated in the accumulating portion can be made closer to the drain port when the gas-liquid separator is inclined in a direction perpendicular to the first direction, as compared to a configuration in which the length between the projection portion and the lowest point is made longer than the length between the lowest point and the portion of the second inner wall portion that is positioned on the opposite side of the lowest point from the projection portion. As a result, it is possible to promote drainage of accumulated water from the drain port.

(6) In the gas-liquid separator according to the above-mentioned aspect, the cover member may include a drain flow path forming portion that forms a drain flow path through which the water accumulated in the accumulating portion is drained; the cover member may be configured such that a valve unit including a communication flow path that communicates with the drain flow path and a valve that controls circulation of the water in the communication flow path is attached to the cover member; and a position of a bottom surface of the drain flow path in a vertical direction may be same as or above a position of a bottom surface of the communication flow path in the vertical direction in a state in which the valve unit is attached to the cover member and the gas-liquid separator is placed. In the gas-liquid separator with this configuration, the position of the bottom surface of the drain flow path in the vertical direction is the same as or above the position of the bottom surface of the communication flow path in the vertical direction. Therefore, water can be prevented from remaining inside the drain flow path and can be smoothly drained. Thus, it is possible to prevent occurrence of a situation in which water remaining in the drain flow path adheres to the valve and freezes and thus the valve cannot be opened due to freezing of the water, and to prevent occurrence of a situation in which the accumulated water is discontinuously drained and thus noise offensive to the ear is caused due to the discontinuous drainage of the accumulated water.

It is possible to realize the invention in various aspects. The invention may be realized in, for example, a fuel cell system, an end plate for a fuel cell, a cover member for a gas-liquid separator, or a method for separating and draining water contained in an off-gas discharged from a fuel cell.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 10A and 10B are explanatory views each showing the arrangement of water accumulated in the gas-liquid separator (the accumulating portion);

DETAILED DESCRIPTION OF EMBODIMENTS

Figure 1:
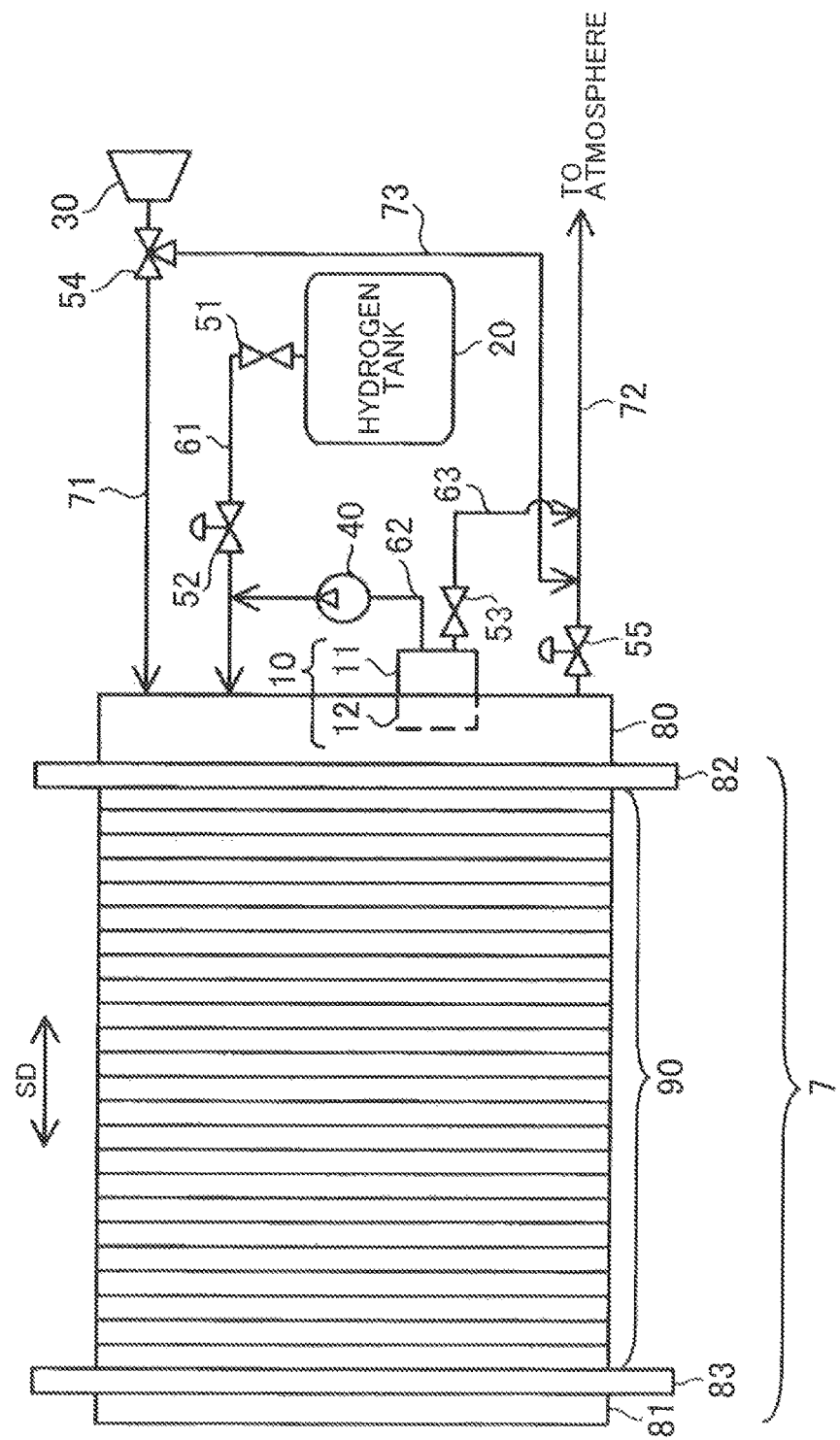
FIG. 1 is a block diagram showing the schematic configuration of a fuel cell system to which a gas-liquid separator is applied in an embodiment of the invention.

FIG. 1 is a block diagram showing the schematic configuration of a fuel cell system to which a gas-liquid separator is applied in an embodiment of the invention. In the embodiment, a fuel cell system 5 is installed and used in a fuel cell vehicle as a system that supplies a driving power supply. Note that instead of being installed in a fuel cell vehicle, the fuel cell system 5 may be installed and used in any movable body such as an electric vehicle that requires a driving power supply. The fuel cell system 5 includes a fuel cell 7, a gas-liquid separator 10, a hydrogen tank 20, an air compressor 30, a circulation pump 40, a shut-off valve 51, an injector 52, an exhaust and drain valve 53, a three-way valve 54, a pressure regulation valve 55, a fuel gas supply path 61, a fuel gas circulation path 62, a fuel gas discharge path 63, an oxidant gas supply path 71, an oxidant gas discharge path 72, and a bypass flow path 73. Note that a configuration that circulates a cooling medium via the fuel cell 7 is omitted in FIG. 1 for the purpose of description.

The fuel cell 7 includes a cell stack 90 having a structure in which a plurality of unit cells is stacked in a stack direction SD, a pair of terminal plates 82 and 83 respectively contacting both end surfaces of the cell stack 90 in the stack direction SD, a first end plate 80 disposed outside the terminal plate 82 in the stack direction SD, and a second end plate 81 disposed outside the terminal plate 83 in the stack direction SD. Each of unit cells constituting the cell stack 90 generates electric power when a fuel gas (hydrogen) supplied to an anode-side catalytic electrode layer and an oxidant gas (oxygen contained in air) supplied to a cathode-side catalytic electrode layer undergo electrochemical reaction. The anode-side catalytic electrode layer and the cathode-side catalytic electrode layer are provided on respective sides of a polymer electrolyte membrane. The catalytic electrode layers contain carbon particles carrying a catalyst, for example, platinum (Pt), and an electrolyte. On the outside of the catalytic electrode layer on each electrode side, a gas diffusion layer made of a porous body is disposed. As a porous body, a carbon porous body such as carbon paper and a carbon cloth, or a metal porous body such as a metal mesh and foam metal is, for example, used. Inside the fuel cell 7, manifolds, through which a fuel gas, an oxidant gas, and a cooling medium flow, are formed along the stack direction SD. The two terminal plates 82 and 83 are plate members that function as integrated electrodes in the fuel cell 7. The first end plate 80 has a substantially plate-shaped appearance whose thickness direction matches the stack direction SD. The first end plate 80 has the function of holding the cell stack 90 and the pair of terminal plates 82 and 83 together with the second end plate 81, the function of providing flow paths for supplying a fuel gas, an oxidant gas, and a cooling medium to the manifolds inside the cell stack 90 and for discharging these media, and the function of constituting a part of the gas-liquid separator 10. Like the first end plate 80, the second end plate 81 has a substantially plate-shaped appearance whose thickness direction matches the stack direction SD. The second end plate 81 has the function of holding the cell stack 90 and the pair of terminal plates 82 and 83, together with the first end plate 80. However, unlike the first end plate 80, the second end plate 81 does not have the function of providing flow paths for supplying and discharging a fuel gas, an oxidant gas, and a cooling medium and the function of constituting a part of the gas-liquid separator 10.

The gas-liquid separator 10 is connected to the manifold that discharges a fuel gas inside the cell stack 90. The gas-liquid separator 10 separates water contained in an off-gas discharged from the manifold and discharges the water, while discharging a gas (fuel gas) from which the water has been separated. The gas-liquid separator 10 is constituted by a gas-liquid separator forming portion 12 and a cover member 11. The gas-liquid separator forming portion 12 is provided in the first end plate 80, and is opened in the outside end surface (hereinafter called the "cover facing surface") of the first end plate 80 in the stack direction SD. The gas-liquid separator forming portion 12 has an appearance recessed in the thickness direction of the first end plate 80, more specifically in a direction from the first end plate 80 to the terminal plate 82 along the stack direction SD. The cover member 11 contacts the cover facing surface of the first end plate 80 and is disposed so as to cover the opening of the gas-liquid separator forming portion 12. The cover member 11 is opened in its surface facing the gas-liquid separator forming portion 12 and has an appearance recessed in its thickness direction, more specifically in a direction from the gas-liquid separator forming portion 12 to the cover member 11 along the stack direction SD. Note that the detailed configuration of the gas-liquid separator 10 will be described later.

The hydrogen tank 20 stores high-pressure hydrogen and supplies a hydrogen gas to the fuel cell 7 as a fuel gas. The air compressor 30 supplies air to the fuel cell 7 as an oxidant gas. The circulation pump 40 is disposed on the fuel gas circulation path 62 and supplies a fuel gas discharged from the gas-liquid separator 10 (a fuel gas from which water has been separated) to the fuel gas supply path 61. The shut-off valve 51 is disposed in the vicinity of the fuel-gas discharge port of the hydrogen tank 20 and switches between the start and the stop of supplying a hydrogen gas from the hydrogen tank 20. The injector 52 is disposed on the fuel gas supply path 61 and regulates a supply amount (flow rate) of a hydrogen gas flowing to the fuel cell 7 and pressure of the hydrogen gas. The exhaust and drain valve 53 is disposed on the fuel gas discharge path 63 and switches between the start and the stop of discharging water and an off-gas from the gas-liquid separator 10. Note that the opening/closing of the exhaust and drain valve 53 is controlled by a control portion (not shown). For example, the exhaust and drain valve 53 is periodically opened/closed at prescribed intervals according to operation conditions (such as a vehicle speed of a fuel cell vehicle and a depressing amount (an operation amount) of an accelerator pedal). The three-way valve 54 is disposed on the oxidant gas supply path 71 and regulates an amount of air to be supplied to the oxidant gas supply path 71 and an amount of air to be supplied to the bypass flow path 73, in the whole amount of air supplied from the air compressor 30. The pressure regulation valve 55 is disposed on the oxidant gas discharge path 72 and regulates pressure on the cathode discharge side (i.e., back pressure) of the fuel cell 7.

The circulation mode of a fuel gas in the fuel cell system 5 will be described. A hydrogen gas supplied from the hydrogen tank 20 is supplied to the fuel cell 7 via the fuel gas supply path 61. An off-gas (anode-side off-gas) discharged from the fuel cell 7 is supplied to the gas-liquid separator 10, and at least part of water contained in the off-gas is separated. The off-gas (i.e., the fuel gas) from which the water has been separated is returned to the fuel gas supply path 61 via the fuel gas circulation path 62 and the circulation pump 40 and then supplied to the fuel cell 7 again. Note that in addition to the water separated from the off-gas, part of the off-gas supplied to the gas-liquid separator 10 is discharged to the fuel gas discharge path 63 via the exhaust and drain valve 53. The fuel gas discharge path 63 is connected to the oxidant gas discharge path 72, and the water and the anode-side off-gas discharged to the fuel gas discharge path 63 are discharged to the atmosphere via the oxidant gas discharge path 72 together with water and a cathode-side off gas discharged from the fuel cell 7. While the fuel gas discharge path 63 communicates with the oxidant gas discharge path 72 opened to the atmosphere, back pressure greater than air pressure is applied to the inside of the gas-liquid separator 10. Therefore, an air pressure difference exists between areas on both sides of the exhaust and drain valve 53. Accordingly when the exhaust and drain valve 53 is opened, an off-gas is discharged from the gas-liquid separator 10 to the fuel gas discharge path 63 by the above-mentioned pressure difference.

The circulation mode of an oxidant gas in the fuel cell system 5 will be described. Air (compression air) supplied from the air compressor 30 is supplied to the fuel cell 7 via the oxidant gas supply path 71. At this time, a supply amount of the air to the fuel cell 7 can be regulated by the regulation of an opening degree of the three-way valve 54. An off-gas (cathode-side off-gas) and water discharged from the fuel cell 7 are discharged to the oxidant gas discharge path 72 via the pressure regulation valve 55. The oxidant gas discharge path 72 is connected to the fuel gas discharge path 63 as described above and also connected to the bypass flow path 73. Accordingly, the cathode-side off-gas discharged from the fuel cell 7 is discharged to the atmosphere together with an anode-side off-gas and water discharged via the fuel gas discharge path 63 and air discharged via the bypass flow path 73.

Note that like the above-mentioned exhaust and drain valve 53, the operations of the air compressor 30, the circulation pump 40, and other valves are controlled by the control portion (not shown). The control portion includes, for example, a read only memory (ROM) that stores a control program, a central processing unit (CPU) that reads the control program from the ROM and executes the control program, and a random access memory (RAM) that is used as a work area for the CPU.

Figure 2:
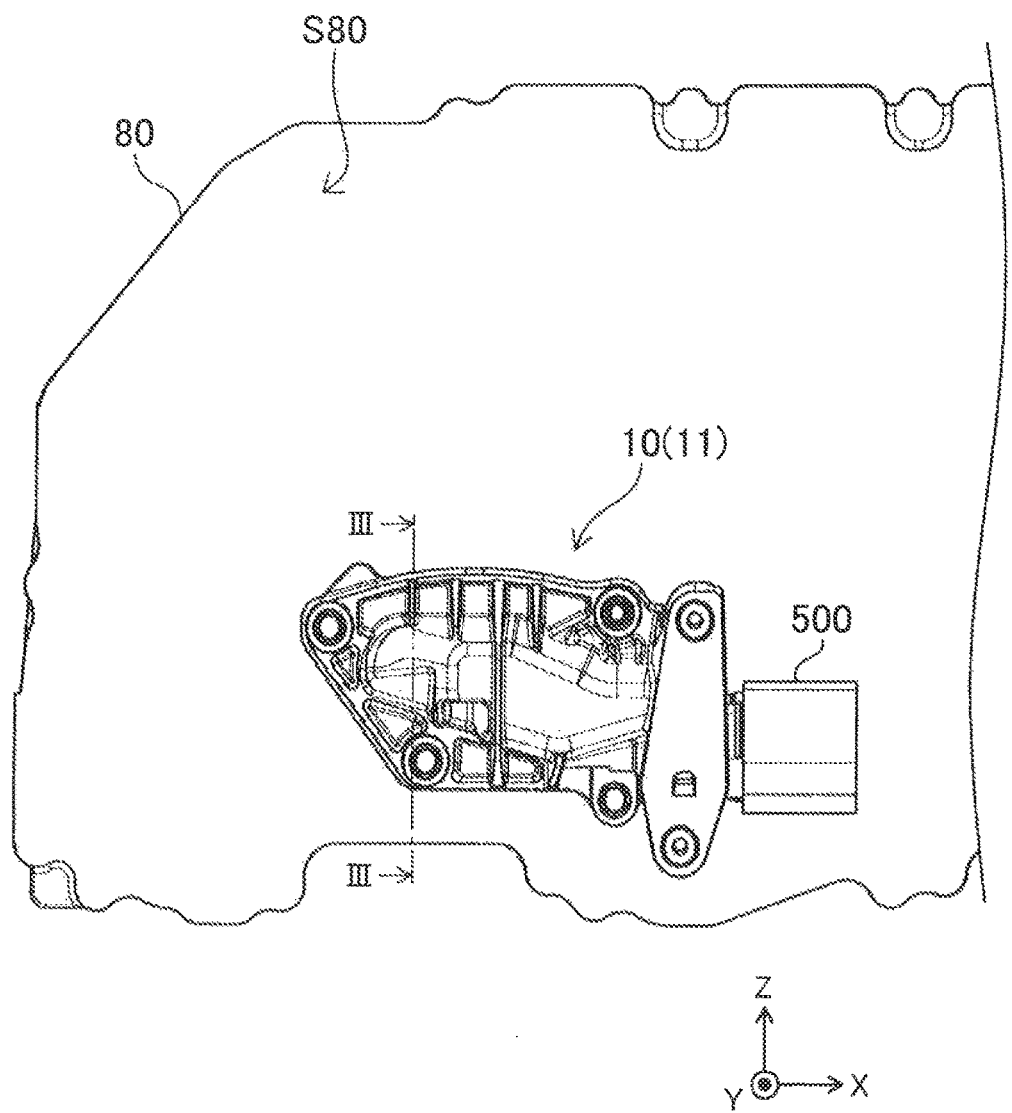
FIG. 2 is a plan view showing the appearance configuration of a gas-liquid separator.
Figure 3:
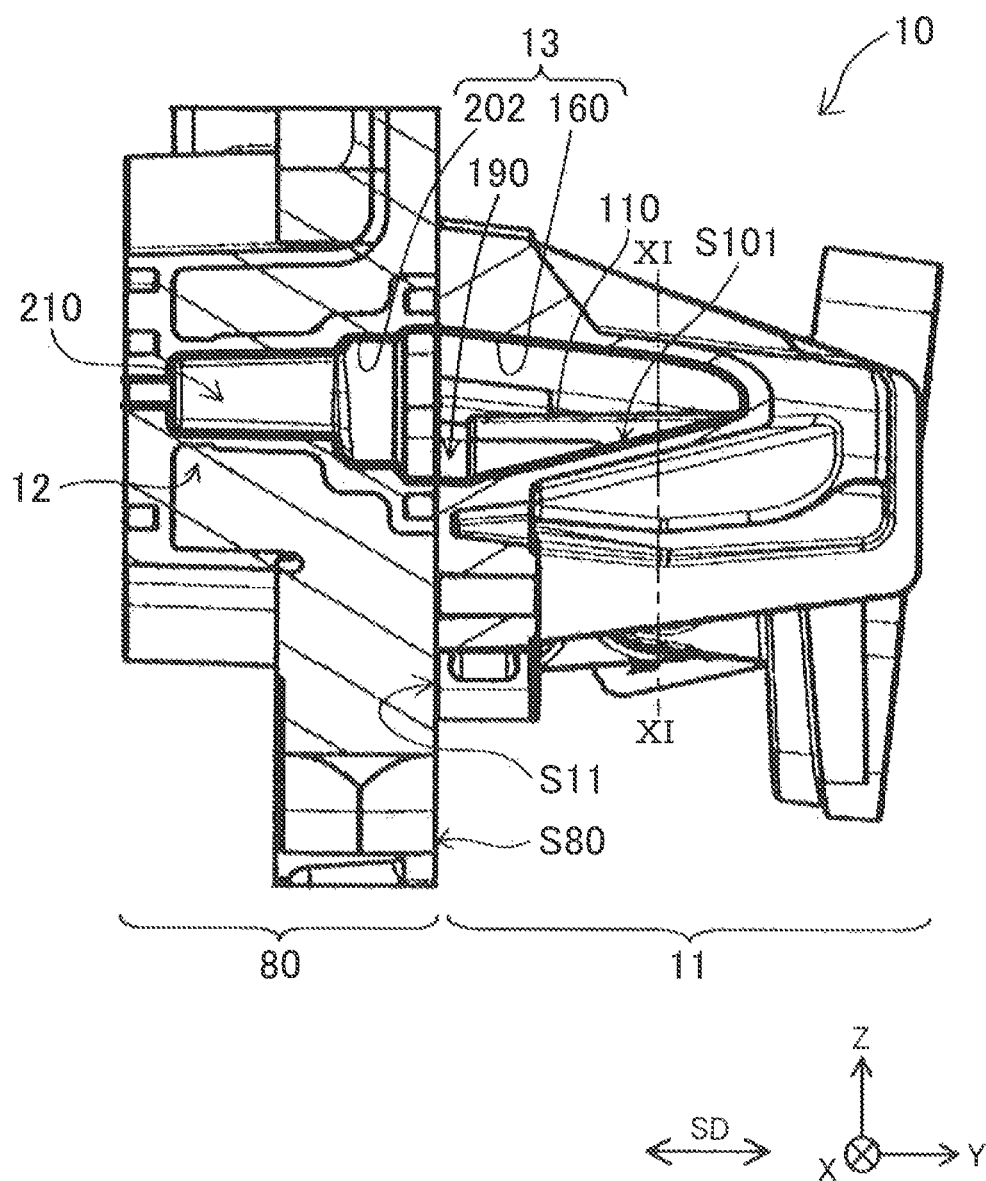
FIG. 3 is a sectional view showing the configuration of the gas-liquid separator.

FIG. 2 is a plan view showing the appearance configuration of the gas-liquid separator 10. FIG. 3 is a sectional view showing the configuration of the gas-liquid separator 10. FIG. 2 shows the plan view of the gas-liquid separator 10 when seen in a direction from the first end plate 80 to the terminal plate 82 and the cell stack 90. Since a part of the gas-liquid separator 10 is formed in the first end plate 80 as described above, the first end plate 80 is also partially drawn in FIGS. 2 and 3. Note that FIG. 2 also shows a valve unit 500 connected to the gas-liquid separator 10. FIG. 3 shows a section taken along line III-III in FIG. 2. Unless otherwise stated, the following figures show the constituents of the fuel cell system 5 (the gas-liquid separator 10) in a state in which a fuel cell vehicle including the fuel cell system 5 is disposed on a horizontal surface. In addition, in the following figures, an X axis and a Y axis are parallel to the horizontal surface, and a Z axis is parallel to a vertical direction. Moreover, a +Z direction shows a vertically upward direction, and a −Z direction shows a vertically downward direction. Furthermore, a +X direction shows the front direction of the fuel cell vehicle, and a −X direction shows the rear direction of the fuel cell vehicle. Note that the stack direction SD is parallel to the Y axis in the embodiment.

As shown in FIG. 2, the cover member 11 is attached to a cover facing surface S80 of the first end plate 80 by bolts. The valve unit 500 is connected to the end of the cover member 11 in the +X direction. The valve unit 500 includes the exhaust and drain valve 53 and a driving portion that drives the exhaust and drain valve 53 to open/close the exhaust and drain valve 53. Note that the details of the connected portion between the cover member 11 and the valve unit 500 will be described later. The shape of the cover member 11 in the plan view is a substantially rectangular shape whose longitudinal direction matches the X axis direction, and its thickness direction matches a direction parallel to the Y axis direction.

As shown in FIG. 3, the gas-liquid separator forming portion 12 is formed in the first end plate 80. The gas-liquid separator forming portion 12 includes a first inner wall portion 202 and a gas supply path 210 extending in the thickness direction (the Y axis direction) of the first end plate 80. The first inner wall portion 202 is connected to the opening formed in the cover facing surface S80. The first inner wall portion 202 has a shape recessed in the thickness direction (the Y axis direction) of the first end plate 80. The first inner wall portion 202 forms an accumulating portion 13, together with a second inner wall portion 160 of the cover member 11 that will be described later. The accumulating portion 13 has a substantially spherical appearance collapsed in the Z axis direction. The accumulating portion 13 functions as a flow path for an anode-side off-gas and has the function of temporarily accumulating water separated from the anode-side off-gas. The end of the gas supply path 210 in the −Y direction reaches the end surface of the first end plate 80 on the side of the terminal plate 82. In addition, the end of the gas supply path 210 in the +Y direction communicates with the inner space of the accumulating portion 13. The gas supply path 210 guides an anode-side off-gas discharged from the cell stack 90 via the terminal plate 82 into the accumulating portion 13.

The cover member 11 has an opening at its surface (hereinafter called a "forming portion facing surface") S11 that faces the cover facing surface S80 of the first end plate 80. The cover member 11 has the second inner wall portion 160 that is connected to the opening and that has a shape recessed in the thickness direction (the Y axis direction) of the cover member 11. The shape and the size of the opening formed in the forming portion facing surface S11 of the cover member 11 are the same as those of the opening formed in the cover facing surface S80 of the gas-liquid separator forming portion 12. When the cover member 11 is disposed such that these two openings face each other, the first inner wall portion 202 and the second inner wall portion 160 are connected to each other to form the above-mentioned accumulating portion 13. The cover member 11 includes a projection portion 110 inside the accumulating portion 13. The projection portion 110 projects upward from the bottom surface of the second inner wall portion 160. The end surface of the projection portion 110 in the −Y direction is offset in the +Y direction from (in other words, deviates in the +Y direction from) the forming portion facing surface S11 of the cover member 11. Therefore, a gap 190 is formed at an area adjacent in the −Y direction to the end surface of the projection portion 110 in the −Y direction. Note that the details of the projection portion 110 and the gap 190 will be described later. In addition, the cover member 11 includes an inclined surface S101 at a part of the bottom surface of the second inner wall portion 160 (the accumulating portion 13). The inclined surface S101 is gradually inclined downward along the direction (−Y direction) from the cover member 11 to the gas-liquid separator forming portion 12.

Figure 4:
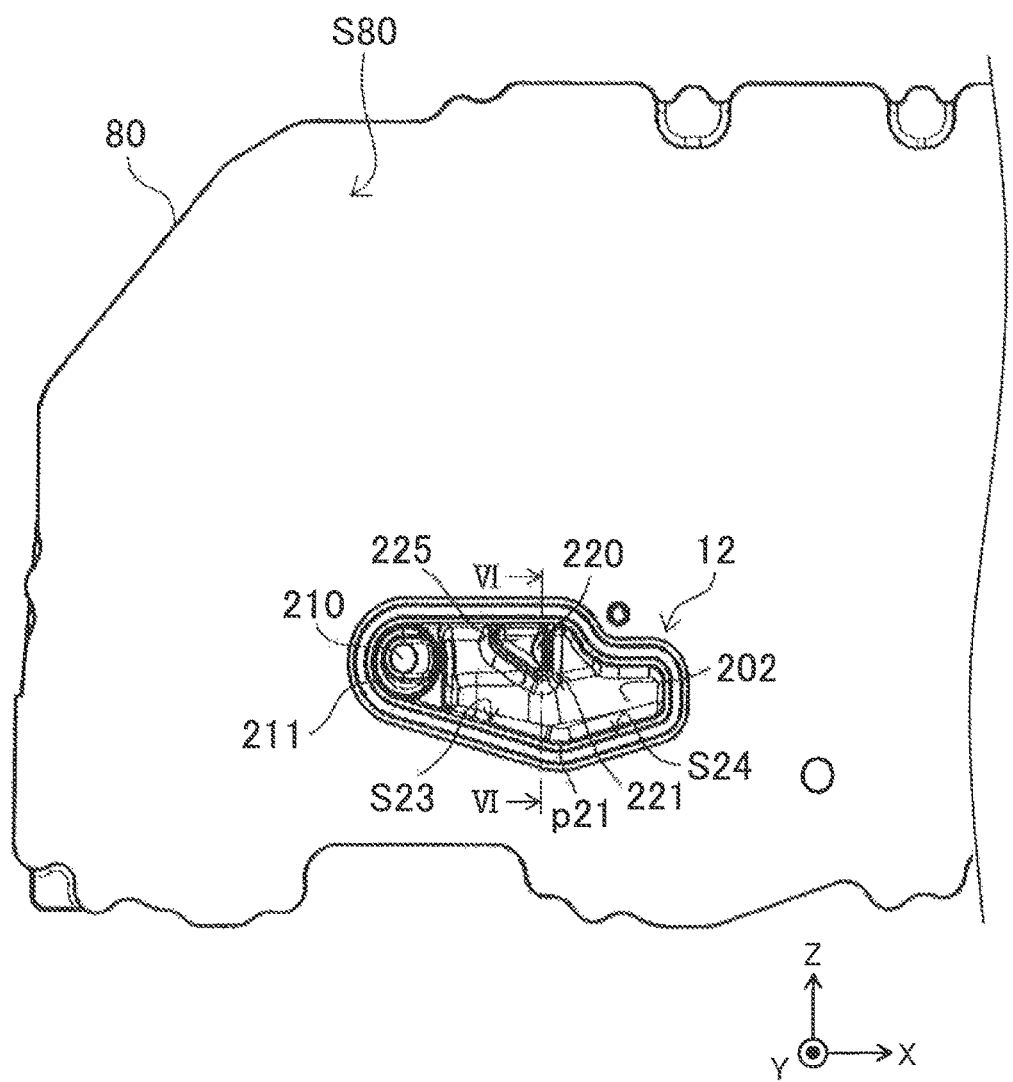
FIG. 4 is a plan view showing the configuration of a gas-liquid separator forming portion.
Figure 5:
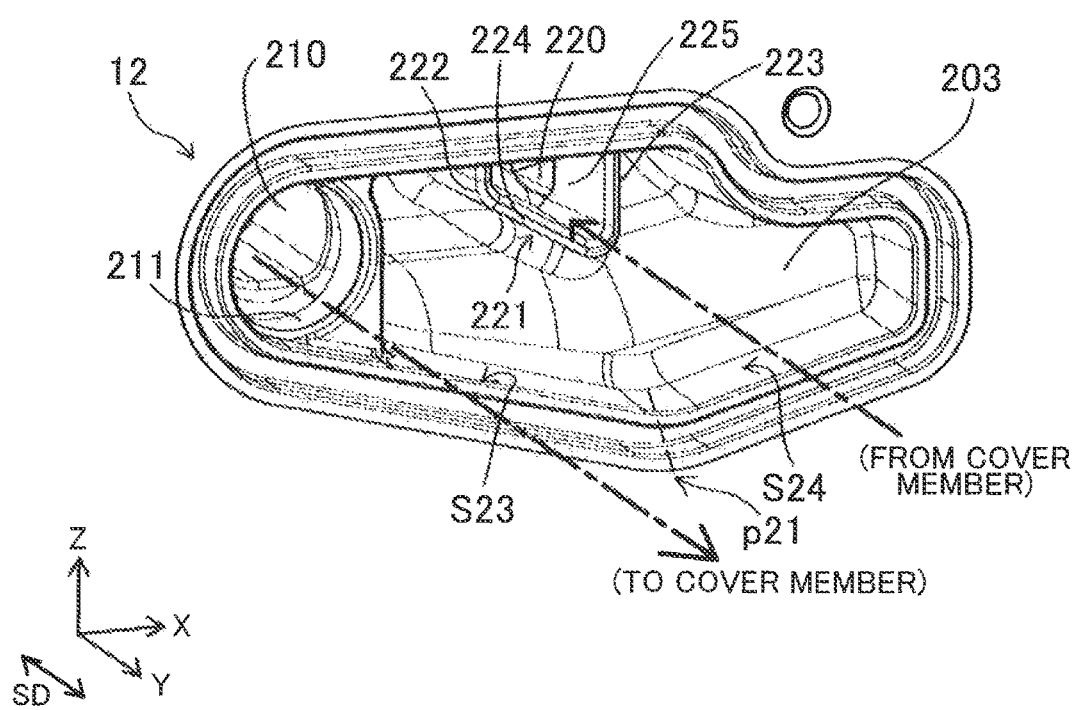
FIG. 5 is a perspective view showing the configuration of the gas-liquid separator forming portion.

FIG. 4 is a plan view showing the configuration of the gas-liquid separator forming portion 12. FIG. 5 is a perspective view showing the configuration of the gas-liquid separator forming portion 12. In FIG. 4, the cover member 11 is removed from a state shown in FIG. 2 to expose the gas-liquid separator forming portion 12.

The gas-liquid separator forming portion 12 includes a gas supply path forming portion 211 and a surrounding portion 221 in addition to the above-mentioned first inner wall portion 202. The gas supply path forming portion 211 is disposed at the end of the gas-liquid separator forming portion 12 in the −X direction to form the gas supply path 210. Specifically, the gas supply path forming portion 211 includes an inner wall that extends in parallel with the Y axis direction (the stack direction SD), and has a circular cross section, and the inner wall forms the gas supply path 210. Note that the end of the gas supply path forming portion 211 in the +Y direction corresponds to a gas inflow port through which gas flows into the accumulating portion 13. As shown by a dashed arrow in FIG. 5, an off-gas flows to the cover member 11 through the gas inflow port. The gas supply path forming portion 211 corresponds to an inflow port forming portion according to the invention.

The surrounding portion 221 projects from the end, in the −Y direction, of the first inner wall portion 202 to the +Y direction to surround an off-gas discharge port 220. The surrounding portion 221 has a substantially trapezoidal cross section and a pipe-shaped appearance extending in parallel with the Y axis. The surrounding portion 221 includes a first wall portion 222, a second wall portion 223, and a third wall portion 224. The first wall portion 222 projects downward from the ceiling of the first inner wall portion 202 and is disposed in substantially parallel with a Y-Z plane. The second wall portion 223 is disposed in parallel with the first wall portion 222 at a position away from the first wall portion 222 in the +X direction. The third wall portion 224 connects the lower end of the first wall portion 222 and the lower end of the second wall portion 223 to each other. Here, the length of the second wall portion 223 in the vertical direction (Z axis direction) is greater than the length of the first wall portion 222 in the vertical direction (Z axis direction). Accordingly, the third wall portion 224 is gradually inclined downward toward the +X direction. The above-mentioned three wall portions 222 to 224 and the ceiling of the first inner wall portion 202 form a discharge flow path 225. The discharge flow path 225 restricts the flow of an off-gas heading from the accumulating portion 13 to the off-gas discharge port 220 in the −Y direction. As shown in FIGS. 4 and 5, the off-gas discharge port 220 is formed at the boundary between the end of the discharge flow path 225 in the −Y direction and the inside of the second wall portion 223.

Figure 6:
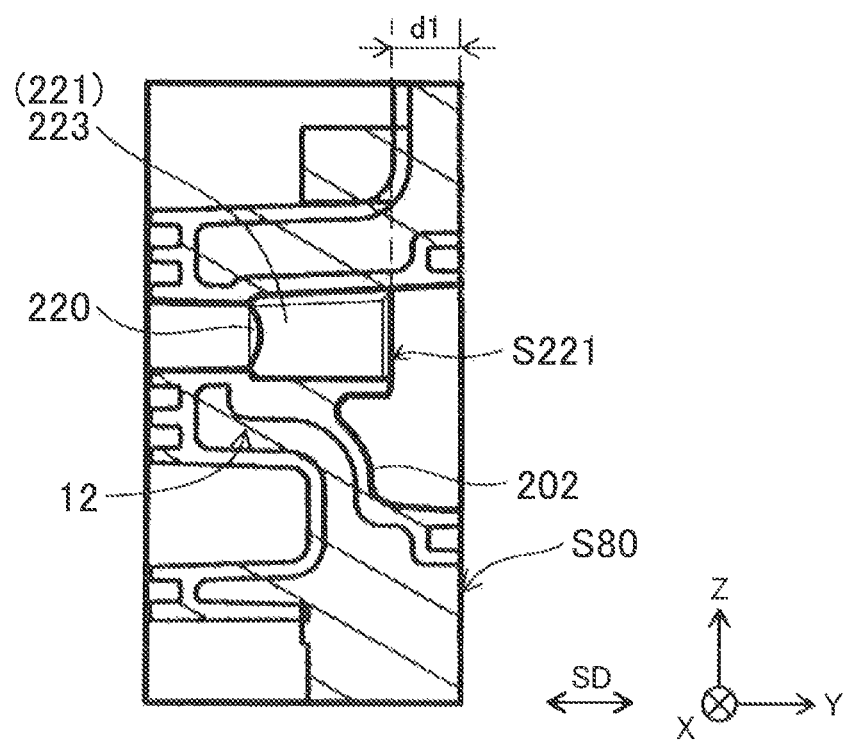
FIG. 6 is a sectional view showing a section of the gas-liquid separator forming portion taken along the line VI-VI shown in FIG. 4.

FIG. 6 is a sectional view showing a section of the gas-liquid separator forming portion 12 taken along the line VI-VI in FIG. 4. As shown in FIG. 6, an end surface S221 of the surrounding portion 221 in the +Y direction is offset (deviates) by a distance d1 in the −Y direction from the cover facing surface S80 that serves as the end surface of the entire gas-liquid separator forming portion 12 in the +Y direction. In other words, the end surface S221 of the surrounding portion 221 does not project from the cover facing surface S80 toward the cover member 11. Since the end surface S221 of the surrounding portion 221 in the +Y direction is offset (deviates) in the −Y direction from the cover facing surface S80 as described above, water accumulated in the cover member 11 is prevented from entering the discharge flow path 225.

As shown in FIGS. 4 and 5, the bottom surface (the surface disposed in the −Z direction) of the first inner wall portion 202 includes a first surface S23 and a second surface S24. Each of these two surfaces S23 and S24 contacts the bottom surface of the cover member 11 (the bottom surface of the second inner wall portion 160). The first surface S23 is at a position adjacent to the second surface S24 in the −X direction and is connected to the second surface S24. The first surface S23 is positioned below the surrounding portion 221 in the vertical direction. The first surface S23 is gradually inclined downward along the +X direction. On the other hand, the second surface S24 is gradually inclined upward along the +X direction. Accordingly, as shown in FIG. 4, the cross section of the first surface S23 and the second surface S24 seen in the −Y direction has a substantially V-shape. The connected portion (linear portion) between the first surface S23 and the second surface S24 includes a lowest point p21 in the gas-liquid separator forming portion 12 in a state in which the gas-liquid separator 10 is placed. Here, in the embodiment, the first surface S23 and the third wall portion 224 of the surrounding portion 221 are disposed in a substantially parallel state. The "substantially parallel state" signifies that the angle between a surface obtained by extending the first surface S23 and a surface obtained by extending the third wall portion 224 is greater than or equal to zero degree and less than or equal to 20 degrees (in other words, the angle is in a range of 0 degree to 20 degrees).

Note that the upper limit of the range is not limited to 20 degrees and may be any value less than 90 degrees. The reason why the first surface S23 and the third wall portion 224 of the surrounding portion 221 are disposed in the substantially parallel state will be described using FIGS. 7A and 7B.

Figure 7A:
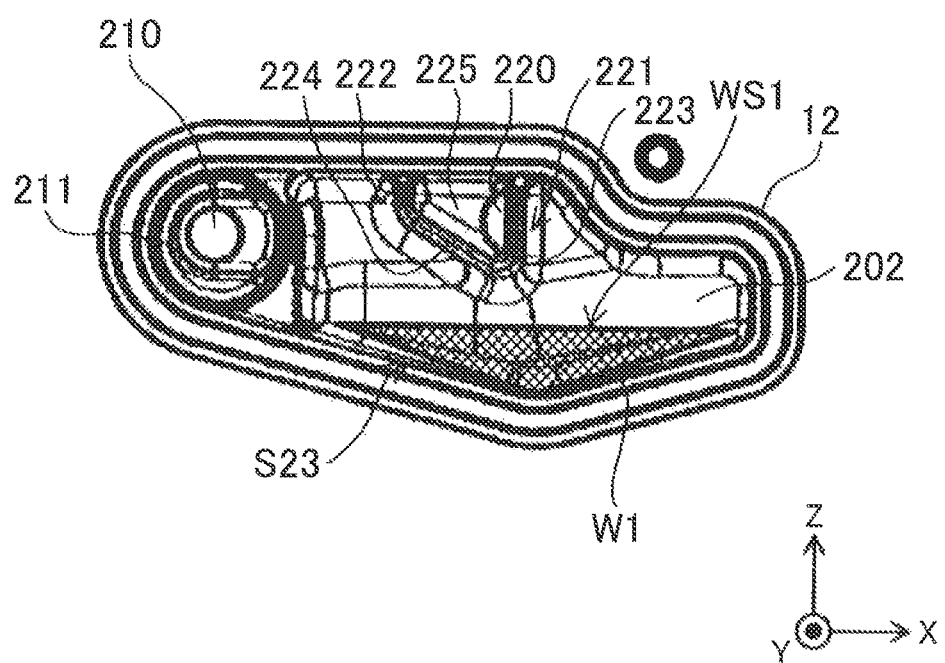
FIGS. 7A and 7B are explanatory views each showing the positional relationship between water accumulated in the gas-liquid separator (an accumulating portion) and a surrounding portion.
Figure 7B:
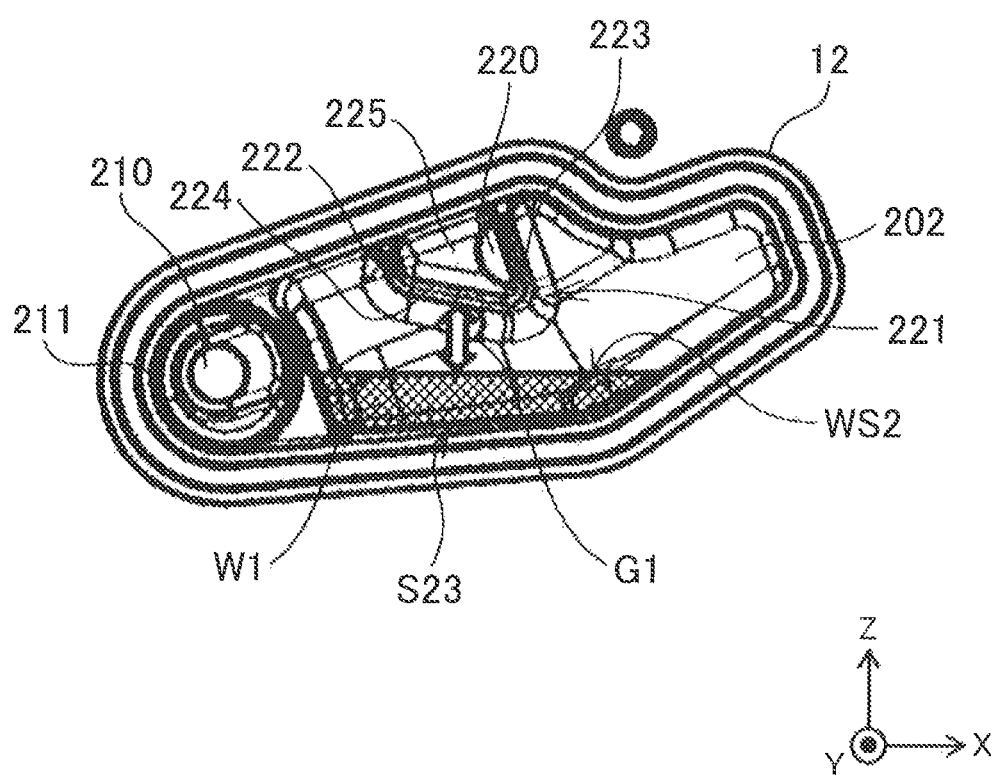

FIGS. 7A and 7B are explanatory views showing the positional relationship between water accumulated in the gas-liquid separator 10 (the accumulating portion 13) and the surrounding portion 221. FIG. 7A shows a state inside the gas-liquid separator forming portion 12 when the fuel cell vehicle travels on a horizontal surface, and FIG. 7B shows a state inside the gas-liquid separator forming portion 12 when the fuel cell vehicle travels on an upward slope.

As shown in FIG. 7A, water W1 separated from an off-gas is accumulated at the bottom of the gas-liquid separator forming portion 12. At this time, a water surface WS1 is at a position lower than the lower end (the intersection between the second wall portion 223 and the third wall portion 224) of the surrounding portion 221.

When the fuel cell vehicle travels on the upward slope with water accumulated in the above-mentioned manner, the gas-liquid separator 10 is disposed such that the end of the gas-liquid separator forming portion 12 in the +X direction is positioned vertically above the end of the gas-liquid separator forming portion 12 in the −X direction. At this time, the first surface S23 is in a state close to a horizontal state, as compared to the state shown in FIG. 7A, and most of the water W1 at the bottom of the gas-liquid separator forming portion 12 is positioned on the first surface S23. Here, since the first surface S23 is substantially parallel to the third wall portion 224, the water surface WS2 of the water W1 becomes substantially parallel to the third wall portion 224. Therefore, the length of a gap G1 between the third wall portion 224 and a water surface WS2 in the Z direction is almost constant at any position. Accordingly, the water surface WS2 is prevented from contacting the third wall portion 224, and the water W1 is prevented from being sucked (drawn) into the off-gas discharge port 220 via the discharge flow path 225.

Figure 8:
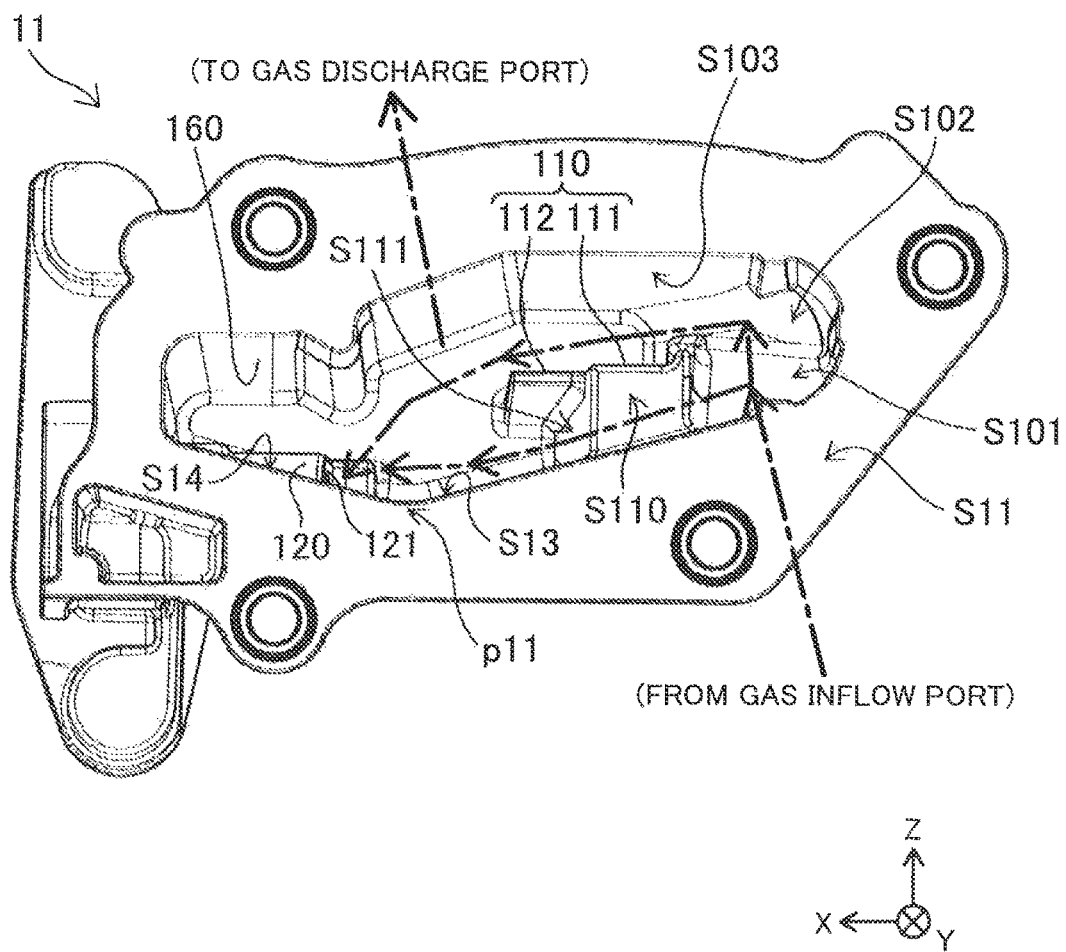
FIG. 8 is a plan view showing the configuration of a cover member.
Figure 9:
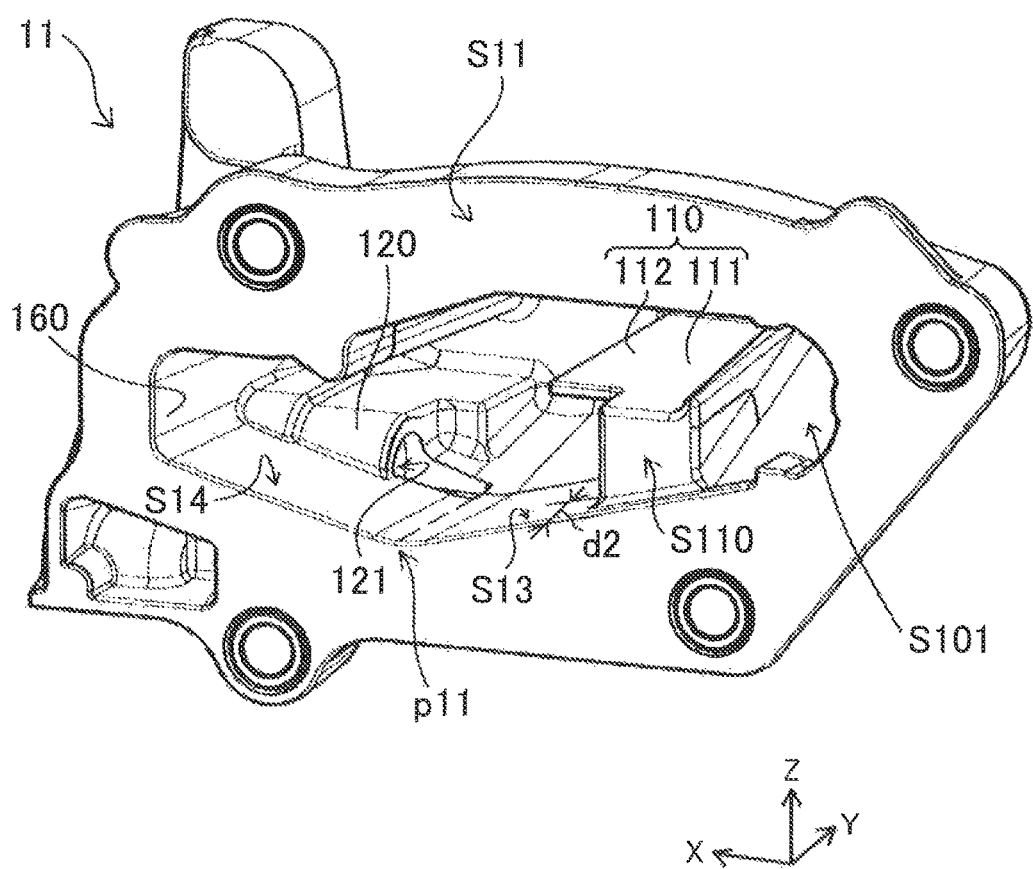
FIG. 9 is a perspective view showing the configuration of the cover member.

FIG. 8 is a plan view showing the configuration of the cover member 11. FIG. 9 is a perspective view showing the configuration of the cover member 11. FIGS. 8 and 9 show the state of the cover member 11 before the cover member 11 is attached to the first end plate 80.

The cover member 11 includes a drain flow path forming portion 120 in addition to the second inner wall portion 160, the projection portion 110, and the inclined surface S101 described above. The projection portion 110 is disposed between the position located in the second inner wall portion 160 and facing the gas inflow port, and a drain port 121 formed in the drain flow path forming portion 120, in the cover member 11. The projection portion 110 includes a thick portion 111 and a thin portion 112 and has a structure in which the thick portion 111 and the thin portion 112 are integrated with each other. The thick portion 111 is greater in length than the thin portion 112 in the Z axis direction and contacts the bottom surface of the second inner wall portion 160. The end surface S110 of the thick portion 111 in the −Y direction is offset (deviates) by a distance d2 in the +Y direction from the forming portion facing surface S11 that serves as the end surface of the entire cover member 11 in the −Y direction. Thin portion 112 has a thin-plate-shaped appearance and is positioned in the +X direction with respect to the thick portion 111. The surface of the thin portion 112 in the +Z direction is integrated with the end surface of the thick portion 111 in the +Z direction to form a surface (ceiling surface). The lower end (the end surface in the −Z direction) of the thin portion 112 does not contact the bottom surface of the second inner wall portion 160. Accordingly, the thin portion 112 is supported by the thick portion 111. The ceiling surface of the thick portion 111 and the thin portion 112 does not contact the second inner wall portion 160. Accordingly, a gap is formed between the projection portion 110 and the ceiling surface of the second inner wall portion 160.

The bottom surface of the second inner wall portion 160 includes a third surface S13 and a fourth surface S14. The third surface S13 contacts the first surface S23 of the gas-liquid separator forming portion 12 to form a surface. Likewise, the fourth surface S14 contacts the second surface S24 of the gas-liquid separator forming portion 12 to form a surface. Accordingly, like the cross section of the first surface S23 and the second surface S24 seen in the −Y direction, the cross section of the third surface S13 and the fourth surface S14 seen in the +Y direction has a substantially V-shape. The connected portion (linear portion) between the third surface S13 and the fourth surface S14 includes a lowest point p11 in the cover member 11 in a state in which the gas-liquid separator 10 is placed. The lowest point p11 corresponds to the lowest point p21 of the gas-liquid separator forming portion 12 in the Y axis direction. The projection portion 110 is disposed in contact with the third surface S13.

The inclined surface S101 is disposed in the −X direction with respect to the projection portion 110 and contacts the lower end of the projection portion 110. The inclined surface S101 faces the gas inflow port formed in the gas-liquid separator forming portion 12. As described above, the inclined surface S101 is gradually inclined downward along the direction (−Y direction) from the cover member 11 to the gas-liquid separator forming portion 12. In other words, the inclined surface S101 is gradually inclined upward along the direction (+Y direction) from the gas-liquid separator forming portion 12 to the cover member 11. The lower end of the inclined surface S101, i.e., the end of the inclined surface S101 in the −Y direction contacts the bottom surface of the gap 190 shown in FIG. 3.

The drain flow path forming portion 120 is disposed in contact with the bottom surface of the second inner wall portion 160. Inside the drain flow path forming portion 120, a drain flow path (not shown) extending in the +X direction is formed. A drain port 121 is provided at an end of the drain flow path forming portion 120 in the −X direction (in other words, the drain flow path forming portion 120 has the drain port 121 at its end in the −X direction). The drain port 121 is positioned in the vicinity of the bottom surface of the second inner wall portion 160 and exposed to the inside of the accumulating portion 13. Note that the detailed configuration of the drain flow path will be described later. Water accumulated in the accumulating portion 13 is drained to the drain flow path via the drain port 121.

The flow of an off-gas in the accumulating portion 13 will be described using FIG. 8. Most of an off-gas flowing into the accumulating portion 13 from the gas inflow port flows upward along the inclined surface S101 after colliding with the inclined surface S101, and then flows in the substantially +X direction in a region surrounded by a wall S102 in the +Y direction and a wall (ceiling surface) S103 in the +Z direction in the second inner wall portion 160 and the upper surface of the projection portion 110. Since the projection portion 110 is provided, the off-gas flowing upward along the inclined surface S101 is prevented from heading for the bottom surface of the accumulating portion 13 (heading for the −Z direction). Most of the off-gas passing through the upper surface of the projection portion 110 heads for the gas-liquid separator forming portion 12 and is discharged from the off-gas discharge port 220 via the discharge flow path 225. The rest of the off-gas passing through the upper surface of the projection portion 110 is discharged to the drain flow path via the drain port 121 together with water. An extremely small portion of the off-gas flowing into the accumulating portion 13 via the gas inflow port of the gas-liquid separator forming portion 12 falls along the inclined surface S101, heads for the +X direction in the gap 190 shown in FIG. 3, and is discharged from the off-gas discharge port 220 or the drain port 121.

As described above, the off-gas supplied into the gas-liquid separator 10 flows inside the accumulating portion 13 while the off-gas collides with the wall surfaces of the accumulating portion 13 and the ceiling surface of the projection portion 110 and thus the direction of the flow of off-gas changes. Then, the off-gas is discharged from the gas-liquid separator 10. At this time, water contained in the off-gas is shaken off when the off-gas collides with the wall surfaces of the accumulating portion 13 and the upper surface of the projection portion 110, and the water flows downward along the wall surfaces. For example, liquid water at the inclined surface S101 flows downward along the inclined surface S101. Here, since the lower end of the inclined surface S101 is connected to the lower end of the gap 190 and the third surface S13 at the vertically lower position in the gap 190 is inclined downward along the +X direction, the water falling along the inclined surface S101 moves in the +X direction via the gap 190 and heads for the drain port 121. In addition, water shaken off from walls of the second inner wall portion 160 other than the inclined surface S101 flows downward along the respective walls to be accumulated at the bottom of the accumulating portion 13 and is discharged to the drain flow path via the drain port 121.

Here, the drain port 121 is formed in the cover member 11, while the off-gas discharge port 220 of the accumulating portion 13 is formed in the gas-liquid separator forming portion 12. In addition, the drain port 121 is disposed at the bottom of the accumulating portion 13, while the off-gas discharge port 220 is disposed in the vicinity of the ceiling of the accumulating portion 13. In the embodiment, with this structure, the distance between the drain port 121 and the off-gas discharge port 220 is made relatively long to prevent water accumulated in the vicinity of the drain port 121 from flowing into the off-gas discharge port 220. In addition, the projection portion 110 prevents the off-gas flowing into the accumulating portion 13 from linearly heading for the bottom of the accumulating portion 13. With the above-mentioned structure, it is possible to prevent occurrence of a situation in which the off-gas directly collides with the surface of the water accumulated at the bottom of the accumulating portion 13 and thus the water is scattered and flows into the off-gas discharge port 220.

Furthermore, since both the gas inflow port and the off-gas discharge port 220 of the accumulating portion 13 are provided in the gas-liquid separator forming portion 12, and the second inner wall portion 160 of the cover member 11 facing the gas inflow port and the off-gas discharge port 220 has a shape recessed in the +Y direction, the flow of the off-gas inside the accumulating portion 13 is controlled to be a substantially U-shaped flow. The substantially U-shaped flow signifies that the off-gas heads for the cover member 11 via the gas inflow port, moves in the substantially +X direction while colliding with the walls of the accumulating portion 13, and moves from the cover member 11 to the gas-liquid separator forming portion 12 to be discharged from the off-gas discharge port 220. In the embodiment, since the flow of the off-gas inside the accumulating portion 13 is the substantially U-shaped flow as described above, a total length of the flow path for the off-gas inside the accumulating portion 13 is relatively increased to increase the opportunities to separate water from the off-gas.

Figure 10A:
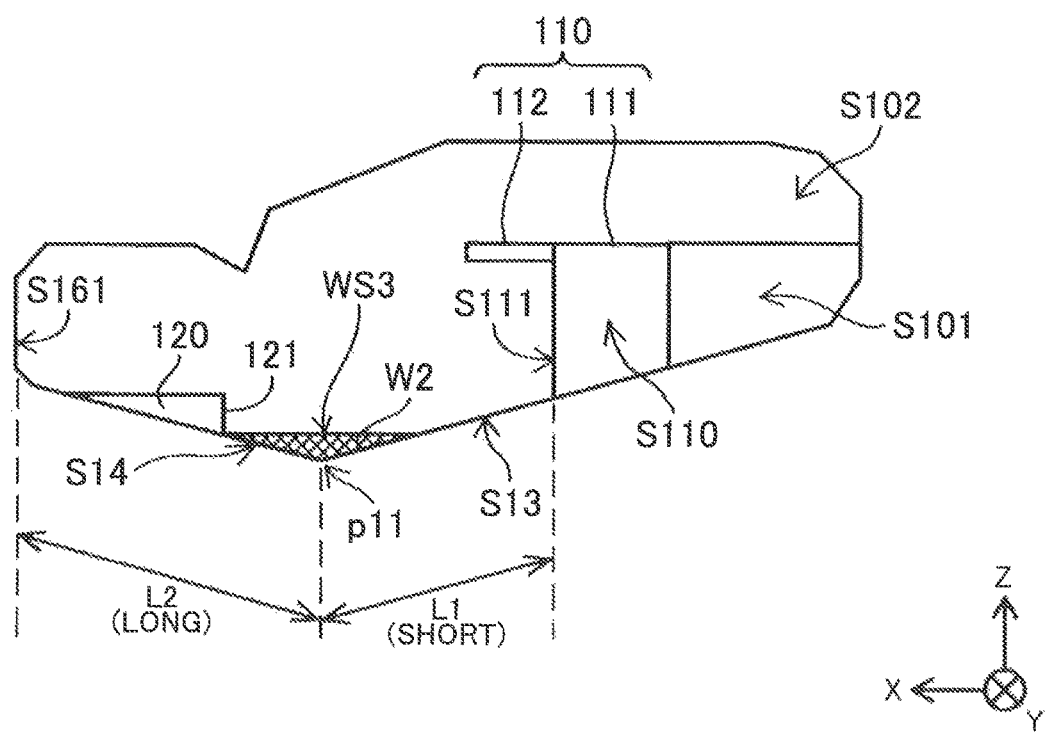

FIGS. 10A and 10B are explanatory views showing the arrangement of water accumulated in the gas-liquid separator 10 (the accumulating portion 13). FIG. 10A shows a state inside the cover member 1 when the fuel cell vehicle travels on a horizontal surface, and FIG. 10B shows a state inside the cover member 11 when the fuel cell vehicle travels on an upward slope.

As shown in FIG. 10A, water W2 separated from an off-gas is accumulated at the bottom of the cover member 11. At this time, a water surface WS3 of the water W2 is positioned in the vicinity of the drain port 121. Therefore, the water W2 is easily drained from the drain port 121.

Here, in the embodiment, a length L1 between an end surface S111 of the projection portion 110 in the +X direction and the lowest point p11 is set to be short. Specifically, the length L1 is set to be shorter than a length L2 between an end surface S161 of the accumulating portion 13 (the second inner wall portion 160) in the +X direction and the lowest point p11. Therefore, as shown in FIG. 10B, when the water W2 moves toward the projection portion 110 while the fuel cell vehicle travels on an upward slope, a height (a position along the vertical direction) of a water surface WS4 of the water W2 can be set at a higher position as compared to a configuration in which the length L1 is longer. As a result, as compared to the configuration in which the length L1 is longer, the water surface WS4 can be set at a position relatively closer to the drain port 121. Thus, it is possible to reduce the possibility that the water W2 cannot be drained from the drain port 121.

Figure 11A:
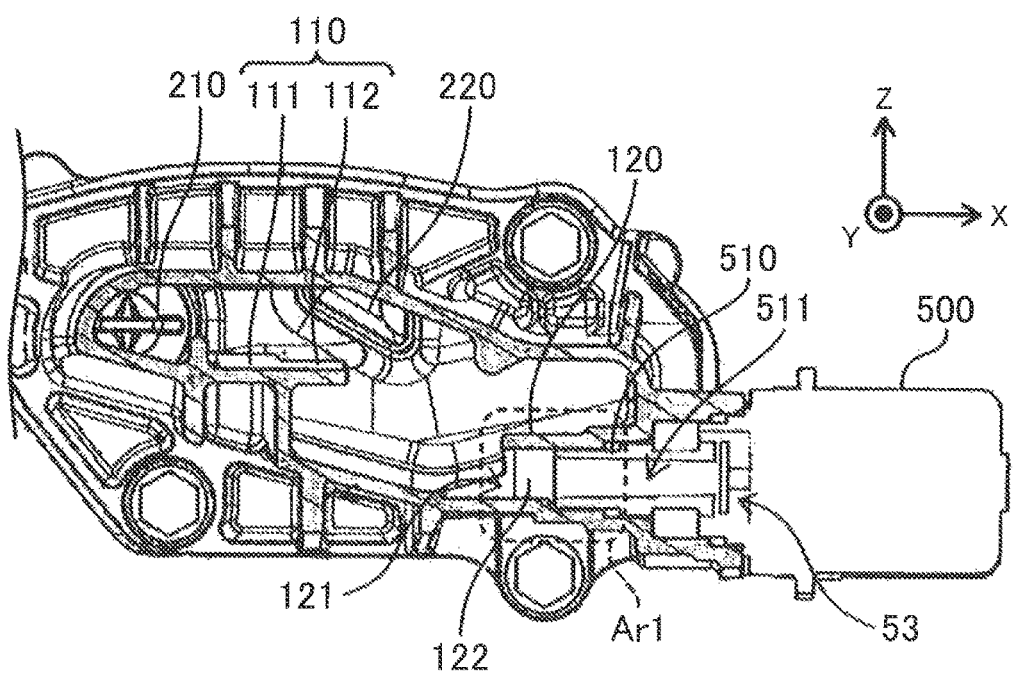
FIGS. 11A to 11C are explanatory views each showing the configuration of the connected portion between the gas-liquid separator and a valve unit.
Figure 11B:
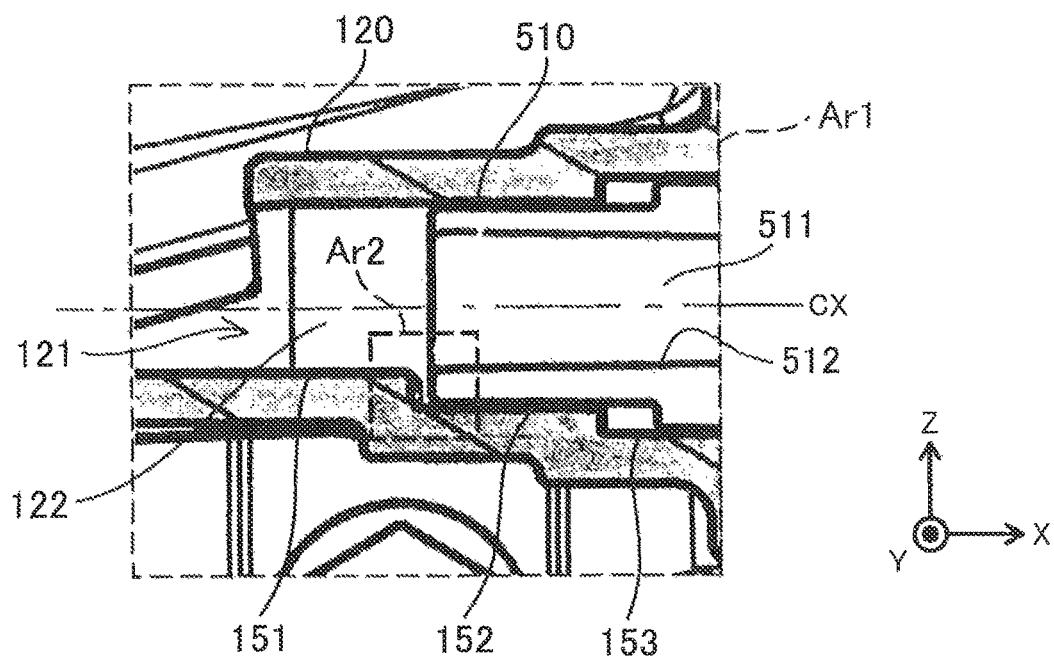
Figure 11C:
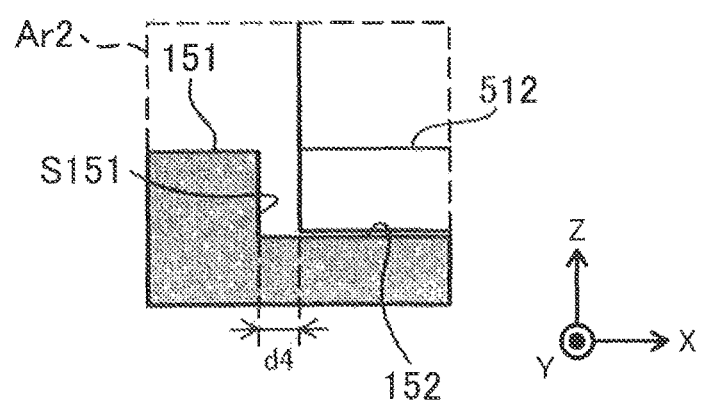

FIGS. 11A, 11B, and 11C are explanatory views showing the configuration of the connected portion between the gas-liquid separator 10 and the valve unit 500. FIG. 11A shows a section taken along line XI-XI in FIG. 3, FIG. 11B shows an area Ar1 in FIG. 1A in an enlarged manner, and FIG. 11C shows an area Ar2 in FIG. 11B in an enlarged manner. Note that the detailed structure of a part of the valve unit 500 in the +X direction is omitted in FIG. 11A.

As shown in FIG. 11A, a drain flow path 122 extending in the X axis direction is formed inside the drain flow path forming portion 120. The end of the drain flow path 122 in the −X direction is formed as the drain port 121. As shown in FIG. 11B, a lower surface (bottom surface) of the drain flow path 122 in the vertical direction includes three surfaces (a first bottom surface 151, a second bottom surface 152, and a third bottom surface 153). The first bottom surface 151, the second bottom surface 152, and the third bottom surface 153 are arranged side by side in the stated order from the drain port 121 in the +X direction. The position of the first bottom surface 151 in the vertical direction is higher than the position of the second bottom surface 152 in the vertical direction. In addition, the position of the second bottom surface 152 in the vertical direction is higher than the position of the third bottom surface 153 in the vertical direction. Accordingly, as shown in FIG. 11B, the position of the bottom surface of the drain flow path 122 in the vertical direction is lowered in a stepwise manner along the +X direction.

The valve unit 500 has a connection portion 510 in the form of a pipe, which extends in the −X direction. A communication flow path 511 is provided inside the connection portion 510. In a state in which the valve unit 500 is attached to the gas-liquid separator 10, the connection portion 510 is inserted in the drain flow path 122. The communication flow path 511 is formed as a through-hole that extends through the connection portion 510 along the X axis direction. Both ends of the communication flow path 511 are opened. One open end of the communication flow path 511 in the −X direction communicates with the drain flow path 122, and the other open end of the communication flow path 511 in the +X direction is positioned inside the valve unit 500. The open end of the communication flow path 511 in the +X direction can be closed by the exhaust and drain valve 53. As shown in FIGS. 11B and 11C, the end of the connection portion 510 in the −X direction is disposed at a position offset (deviated) by a distance d4 in the +X direction from a wall surface S151 along the Z axis direction that connects the first bottom surface 151 and the second bottom surface 152 to each other. This arrangement aims to prevent occurrence of a situation in which the end of the connection portion 510 in the −X direction collides with the wall surface S151 due to variations in manufacturing the valve unit 500 or the gas-liquid separator 10 and the valve unit 500 cannot be normally attached to the gas-liquid separator 10.

Here, as shown in FIGS. 11B and 11C, a position of a vertically lower surface (bottom surface) 512 of the communication flow path 511 in the vertical direction and a position of the first bottom surface 151 in the vertical direction are almost the same. Accordingly, water can be prevented from remaining inside the drain flow path 122 when the water accumulated at the bottom of the accumulating portion 13 is drained and can be smoothly drained. When the operation of the fuel cell system 5 stops with water remaining inside the drain flow path 122 and the environment in which the fuel cell system 5 is disposed becomes an extremely low temperature environment, the water remaining inside the drain flow path 122 may turn into supercooled water. When the fuel cell system 5 activates in this state, there is a possibility that the supercooled water moves to the exhaust and drain valve 53 and freezes in the exhaust and drain valve 53. When water freezes in the exhaust and drain valve 53, there is a possibility that the exhaust and drain valve 53 is not opened to hinder the drain of the water. In addition, when water remains inside the drain flow path 122, there is a possibility that the water is discontinuously drained from the exhaust and drain valve 53 to produce noise offensive to the ear. However, in the fuel cell system 5 of the embodiment, since water is prevented from remaining in the drain flow path 122 as described above, it is possible to prevent occurrence of a situation in which the exhaust and drain valve 53 cannot be opened due to freezing of water, and it is possible to prevent the production of noise offensive to the ear.

Note that the first end plate 80 in the embodiment corresponds to an end plate according to the invention. In addition, the surrounding portion 221, the inclined surface S101, and the exhaust and drain valve 53 in the embodiment correspond to a discharge port forming portion, an inclined surface, and a valve according to the invention, respectively.

Since the gas-liquid separator 10 used in the fuel cell system 5 of the embodiment described above is constituted by the gas-liquid separator forming portion 12 formed as a part of the first end plate 80 and the cover member 11 attached to the first end plate 80, an increase in the total installation space for the first end plate 80 and the gas-liquid separator 10 can be suppressed as compared to a configuration in which a gas-liquid separator is provided separately from the first end plate 80. Therefore, an increase in the size of the fuel cell system 5 can be suppressed. In addition, since the two members are overlapped with each other to constitute the gas-liquid separator 10, the inner structure of the gas-liquid separator 10 including the projection portion 110, the first surface S23, the second surface S24, and the like can be relatively easily manufactured.

In addition, since both the gas inflow port and the off-gas discharge port 220 of the accumulating portion 13 are provided in the gas-liquid separator forming portion 12, and the second inner wall portion 160 of the cover member 11 facing the gas inflow port and the off-gas discharge port 220 has a shape recessed in the +Y direction, the flow of the off-gas inside the accumulating portion 13 can be controlled to be the substantially U-shaped flow. Therefore, the total length of the flow path for the off-gas inside the accumulating portion 13 can be relatively increased. Accordingly, it is possible to increase the opportunities to separate water from the off-gas.

Moreover, the drain port 121 is formed in the cover member 11, and the off-gas discharge port 220 is formed in the gas-liquid separator forming portion 12. Furthermore, the drain port 121 is disposed at the bottom of the accumulating portion 13, and the off-gas discharge port 220 is disposed in the vicinity of the ceiling of the accumulating portion 13. Therefore, the distance between the drain port 121 and the off-gas discharge port 220 can be relatively increased, and water accumulated in the vicinity of the drain port 121 can be prevented from flowing into the off-gas discharge port 220. As a result, the efficiency of separating water from an off-gas can be improved.

Furthermore, since the cover member 11 includes the projection portion 110 in the gas-liquid separator 10, an off-gas supplied from the gas inflow port to the cover member 11 is prevented from linearly heading for the bottom of the accumulating portion 13. Therefore, it is possible to prevent occurrence of the situation in which the off-gas directly collides with the surface of water accumulated at the bottom of the accumulating portion 13 and thus the water is scattered and flows into the off-gas discharge port 220. Furthermore, the projection portion 110 can prevent water accumulated in the accumulating portion 13 from swirling up due to an off-gas that flows inside the accumulating portion 13, and heading for (returning to) the gas inflow port.

Furthermore, the end surface S110 of the projection portion 110 (the thick portion 111) is offset (deviates) by the distance d2 in the +Y direction from the forming portion facing surface S11 that serves as the end surface of the entire cover member 11 in the −Y direction to form the gap 190, and the bottom surface of the gap 190 and the lower end of the inclined surface S101 at the position facing the gas inflow port are connected to each other. Therefore, liquid water falling along the inclined surface S101 can head for the drain port 121 via the gap 190. In addition, since the bottom surface (the third surface S13) of the gap 190 is formed to be inclined downward along the +X direction, the flow of water heading for the drain port 121 can be promoted in the gap 190.

Furthermore, the length L1 between the end surface S111 of the projection portion 110 and the lowest point p11 is set to be shorter than the length L2 between the end surface S161 of the second inner wall portion 160 in the +X direction and the lowest point p11. Therefore, the water surface of water accumulated at the bottom of the accumulating portion 13 can be made closer to the drain port 121 when the fuel cell vehicle travels on an upward slope (when the gas-liquid separator 10 is inclined in the X axis direction), as compared to the configuration in which the length L1 is made longer. As a result, it is possible to promote drainage of water accumulated in the accumulating portion 13.

Furthermore, the position of the first bottom surface 151 in the drain flow path 122 in the vertical direction is almost the same as the position of the bottom surface 512 of the communication flow path 511 of the connection portion 510 in the vertical direction. Therefore, water can be prevented from remaining inside the drain flow path 122 when the water accumulated at the bottom of the accumulating portion 13 is drained, and the water can be smoothly drained. Therefore, it is possible to prevent occurrence of the situation in which the exhaust and drain valve 53 cannot be opened due to water remaining in the drain flow path 122, and it is possible to prevent the production of noise offensive to the ear.

Furthermore, the end surface S221 of the surrounding portion 221 in the +Y direction is offset (deviates) by the distance d1 in the −Y direction from the cover facing surface S80 that serves as the end surface of the entire gas-liquid separator forming portion 12 in the +Y direction. Therefore, water accumulated in the cover member 11 can be prevented from entering the discharge flow path 225. In addition, the bottom surface (the first surface S23 and the third surface S13) of the accumulating portion 13 and the third wall portion 224 of the surrounding portion 221 are formed to be parallel to each other. Therefore, the distance between the water surface of water accumulated in the accumulating portion 13 and the surrounding portion 221 can be relatively increased when the fuel cell vehicle travels on an upward slope. Therefore, water can be prevented from being sucked (drawn) into the off-gas discharge port 220 from the discharge flow path 225.

Figure 12A:
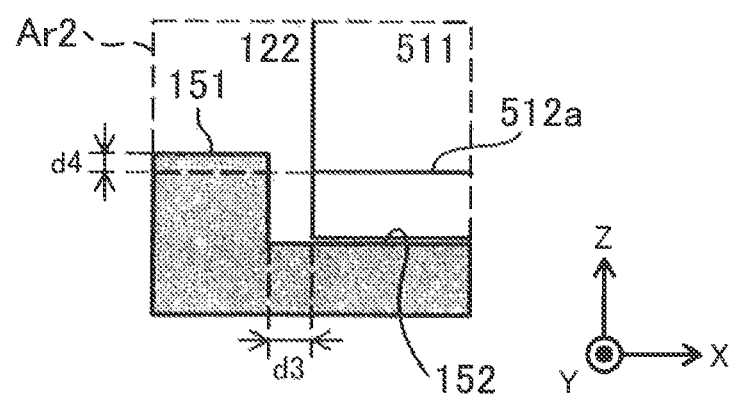
FIGS. 12A and 12B are explanatory views each showing the connected portion between the gas-liquid separator and the valve unit in a modified example in an enlarged manner.
Figure 12B:
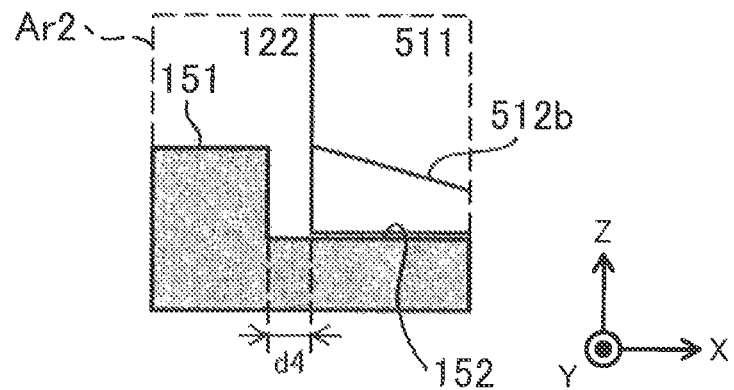

The position of the first bottom surface 151 of the drain flow path 122 in the vertical direction and the position of the bottom surface 512 of the communication flow path 511 in the vertical direction are substantially the same in the above-mentioned embodiment, but the invention is not limited to this configuration. FIGS. 12A and 12B are explanatory views each showing the connected portion between the gas-liquid separator 10 and a valve unit in a modified example in an enlarged manner. FIG. 12A shows the connected portion in a first aspect of the modified example, and FIG. 12B shows the connected portion in a second aspect of the modified example.

In the aspect of FIG. 12A, the position of the first bottom surface 151 of the drain flow path 122 in the vertical direction is above the position of a bottom surface 512a of the communication flow path 511 in the vertical direction. In this aspect as well, water can be prevented from remaining inside the drain flow path 122 when the water accumulated at the bottom of the accumulating portion 13 is drained.

In the aspect of FIG. 12B, the end of a bottom surface 512b of the communication flow path 511 in the −X direction is set at a vertically uppermost position, and the bottom surface 512b is inclined downward along the +X direction. Here, the position, in the vertical direction, of the end of the bottom surface 512b in the −X direction and the position, in the vertical direction, of the first bottom surface 151 of the drain flow path 122 are almost the same. Accordingly, the position of the first bottom surface 151 in the vertical direction is the same as or above the position of any portion of the bottom surface 512b in the vertical direction.

As is understood from the modified example and the embodiment described above, the invention may be applied to a gas-liquid separator in which the position of the first bottom surface 151 of the drain flow path 122 in the vertical direction is the same as or above the position of the bottom surface 512*b* of the communication flow path 511 in the vertical direction.

The above-mentioned embodiment has the feature that the end surface S221 of the surrounding portion 221 in the +Y direction is offset (deviates) by the distance d1 in the −Y direction from the cover facing surface S80 that serves as the end surface of the entire gas-liquid separator forming portion 12 in the +Y direction, and the feature that the bottom surface (the first surface S23 and the third surface S13) of the accumulating portion 13 and the third wall portion 224 of the surrounding portion 221 are formed to be substantially parallel to each other. However, only one of these features may be realized. In this configuration as well, water separated from an off-gas can be prevented from being sucked (drawn) into the off-gas discharge port 220 from the discharge flow path 225.

The configuration of the gas-liquid separator 10 in the above-mentioned embodiment is only an example and may be modified in various ways. For example, both the off-gas inflow port and the off-gas discharge port 220 of the gas-liquid separator 10 are formed in the gas-liquid separator forming portion 12, but at least one of them may be formed in the cover member 11. In addition, the drain flow path forming portion 120 is formed at the bottom of the cover member 11 (the second inner wall portion 160), but may be formed at the bottom of the gas-liquid separator forming portion 12 (the first inner wall portion 202). Moreover, the projection portion 110 may be omitted in the gas-liquid separator 10. Since a part of the gas-liquid separator 10 is formed in the first end plate 80 in this configuration as well, an increase in the size of the fuel cell system can be suppressed. Furthermore, the bottom surface of the gap 190 may not be inclined. Since at least the gap 190 is formed, water falling along the inclined surface S101 and reaching the lower end of the inclined surface S101 is not prevented from heading for the drain port 121. Furthermore, the length L1 shown in FIG. 10A may be equal to or longer than the length L2. Furthermore, the third wall portion 224 that serves as the lower wall of the surrounding portion 221 is substantially parallel to the first surface S23, but may not be substantially parallel to the first surface S23. In this configuration as well, the end surface S221 of the surrounding portion 221 in the +Y direction is offset (deviates) in the −Y direction from the cover facing surface S80. Therefore, water accumulated in the cover member 11 can be prevented from flowing into the discharge flow path 225. The gas-liquid separator forming portion 12 is formed in the first end plate 80 in the above-mentioned embodiment, but may be formed in the second end plate 81 instead of being formed in the first end plate 80. In this configuration, a supply system and a discharge system for a hydrogen gas may be provided in the second end plate 81, and a through-hole that communicates with a circulation manifold for an anode-side reaction gas may be provided in the second end plate 81 and the terminal plate 83.

The invention is not limited to the above-mentioned embodiment and modified example but may be realized by various configurations without departing from its scope. For example, the technical features of the embodiment and the modified example corresponding to the technical features in the respective modes in the column of summary of the invention may be appropriately replaced or combined with each other in order to solve some or all of the above-mentioned problems or achieve some or all of the above-mentioned effects. In addition, the technical features may be appropriately deleted so long as they are not essential in the specification.

What is claimed is:

1. A gas-liquid separator configured to separate and drain water contained in an off-gas discharged from a fuel cell including a cell stack in which a plurality of unit cells is stacked, and an end plate disposed outside the cell stack in a stack direction in which the plurality of unit cells is stacked, the gas-liquid separator comprising:
   a plate configured to be used as the end plate;
   a gas-liquid separator forming portion that is provided in the plate, is opened in an end surface of the plate, and constitutes a part of the gas-liquid separator, the end surface being configured to be located on a side opposite to the cell stack in the stack direction; and
   a cover member that is disposed to cover an opening of the gas-liquid separator forming portion and constitutes a part of the gas-liquid separator, wherein:
   the gas-liquid separator forming portion includes a first inner wall portion that is configured to serve as a flow path for the off-gas and forms a part of an accumulating portion in which the water separated from the off-gas is accumulated, the first inner wall portion being connected to the opening and having a shape recessed in a thickness direction of the plate;
   the cover member includes a second inner wall portion that is connected to an opening provided in a surface of the cover member facing the gas-liquid separator forming portion, and that has a shape recessed in a thickness direction of the cover member, the second inner wall portion being disposed to face the first inner wall portion in the stack direction and forming the accumulating portion together with the first inner wall portion;
   the cover member includes a drain flow path forming portion that forms a drain flow path for the water accumulated in the accumulating portion to be drained;
   the drain flow path has, at an end thereof, a drain port that is disposed in vicinity of a bottom surface of the second inner wall portion and exposed to an inside of the accumulating portion; and
   the cover member further includes an inclined surface that is provided in the second inner wall portion, the inclined surface being gradually inclined downward along a first direction from the cover member to the gas-liquid separator forming portion in the state in which the gas-liquid separator is placed.

2. The gas-liquid separator according to claim 1, wherein:
   the gas-liquid separator forming portion includes an inflow port forming portion that forms an inflow port for the off-gas to flow into the gas-liquid separator and a discharge port forming portion that forms a discharge port for the off-gas to be discharged from the gas-liquid separator.

3. The gas-liquid separator according to claim 2, wherein:
   the cover member further includes a projection portion that projects upward from the bottom surface in a state in which the gas-liquid separator is placed, and that is disposed between a position facing the inflow port and the drain port in the cover member;
   the inclined surface faces the inflow port and is disposed in contact with the projection portion; and
   an end surface of the projection portion in the first direction is offset in a direction opposite to the first direction from an end surface of the entire cover member in the first direction.

4. The gas-liquid separator according to claim 3, wherein a part of the bottom surface, which contacts the end surface of the projection portion in the first direction, is inclined downward toward the drain port in the state in which the gas-liquid separator is placed.

5. The gas-liquid separator according to claim 3, wherein:
a lowest point of the bottom surface is disposed between the projection portion and the drain port; and
a length along the bottom surface and between the projection portion and the lowest point is shorter than a length between the lowest point and a portion of the second inner wall portion that is positioned on an opposite side of the lowest point from the projection portion.

6. The gas-liquid separator according to claim 1, wherein:
the cover member is configured such that a valve unit including a communication flow path that communicates with the drain flow path and a valve that controls circulation of the water in the communication flow path is attached to the cover member; and
a position of a bottom surface of the drain flow path in a vertical direction is same as or above a position of a bottom surface of the communication flow path in the vertical direction in a state in which the valve unit is attached to the cover member and the gas-liquid separator is placed.

7. A fuel cell system comprising:
a fuel cell including a cell stack in which a plurality of unit cells is stacked, and an end plate disposed outside the cell stack in a stack direction in which the plurality of unit cells is stacked; and
a gas-liquid separator configured to separate and drain water contained in an off-gas discharged from the fuel cell, wherein:
the gas-liquid separator includes a gas-liquid separator forming portion that is provided in the end plate, is opened in an end surface of the end plate in the stack direction, and constitutes a part of the gas-liquid separator, the end surface being located on a side opposite to the cell stack, and a cover member that is disposed to cover an opening of the gas-liquid separator forming portion and constitutes a part of the gas-liquid separator;

the gas-liquid separator forming portion includes a first inner wall portion that serves as a flow path for the off-gas and forms a part of an accumulating portion in which the water separated from the off-gas is accumulated, the first inner wall portion being connected to the opening and having a shape recessed in a thickness direction of the end plate;

the cover member includes a second inner wall portion that is connected to an opening provided in a surface of the cover member facing the gas-liquid separator forming portion, and that has a shape recessed in a thickness direction of the cover member, the second inner wall portion being disposed to face the first inner wall portion in the stack direction and forming the accumulating portion together with the first inner wall portion;

the cover member includes a drain flow path forming portion that forms a drain flow path through which the water accumulated in the accumulating portion is drained;

the drain flow path has, at an end thereof, a drain port that is disposed in vicinity of a bottom surface of the second inner wall portion and exposed to an inside of the accumulating portion; and the cover member further includes an inclined surface that is provided in the second inner wall portion, the inclined surface being gradually inclined downward along a first direction from the cover member to the gas-liquid separator forming portion in the state in which the gas-liquid separator is placed.

* * * * *